United States Patent

Asano

[11] 4,241,385
[45] Dec. 23, 1980

[54] CAR LIGHT WITH DETACHABLE PLUG

[75] Inventor: Takehiro Asano, Tokyo, Japan

[73] Assignee: Daiichi Shoji Co., Ltd., Tokyo, Japan

[21] Appl. No.: 904,227

[22] Filed: May 9, 1978

[30] Foreign Application Priority Data

May 17, 1977 [JP] Japan .......................... 52-63427[U]

[51] Int. Cl.³ ........................................ F21V 27/00
[52] U.S. Cl. ................................... 362/258; 362/431
[58] Field of Search .................... 339/88 R, 188–190, 339/253 R, 253 L, 253 S, 254, 272 R, 272 A, 272 UC; 362/258, 431, 347, 226

[56] References Cited

U.S. PATENT DOCUMENTS

| 1,629,243 | 5/1927 | West | 339/88 R |
| 2,938,110 | 5/1960 | Busch | 362/258 |
| 2,979,605 | 4/1961 | Meyerowitz | 362/431 |
| 3,322,944 | 5/1967 | Mellyn | 362/258 |
| 3,410,995 | 11/1968 | Gray | 362/431 |
| 3,439,159 | 4/1969 | McRoskey | 362/258 |
| 3,848,223 | 11/1974 | Pechard | 339/254 M |

Primary Examiner—Samuel W. Engle
Assistant Examiner—Edward F. Miles
Attorney, Agent, or Firm—Mawhinney & Mawhinney & Connors

[57] ABSTRACT

A car light having a variety of practical applications, for example, as a map light with its detachable plug being retained and as an illuminating or warning light for use outside of a car with the plug being detached from the body of the car light. The plug is sized to plug in the cigarette lighter socket of the car and to be retained in its receptacle when a cord is rewound on a reel within a cord chamber between a reflecting mirror and an outer casing by turning either of the mirror of the casing relative to the other.

5 Claims, 5 Drawing Figures

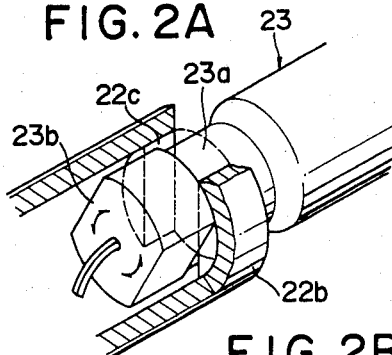
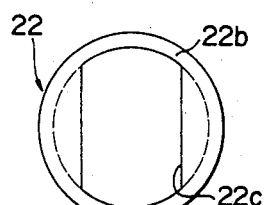
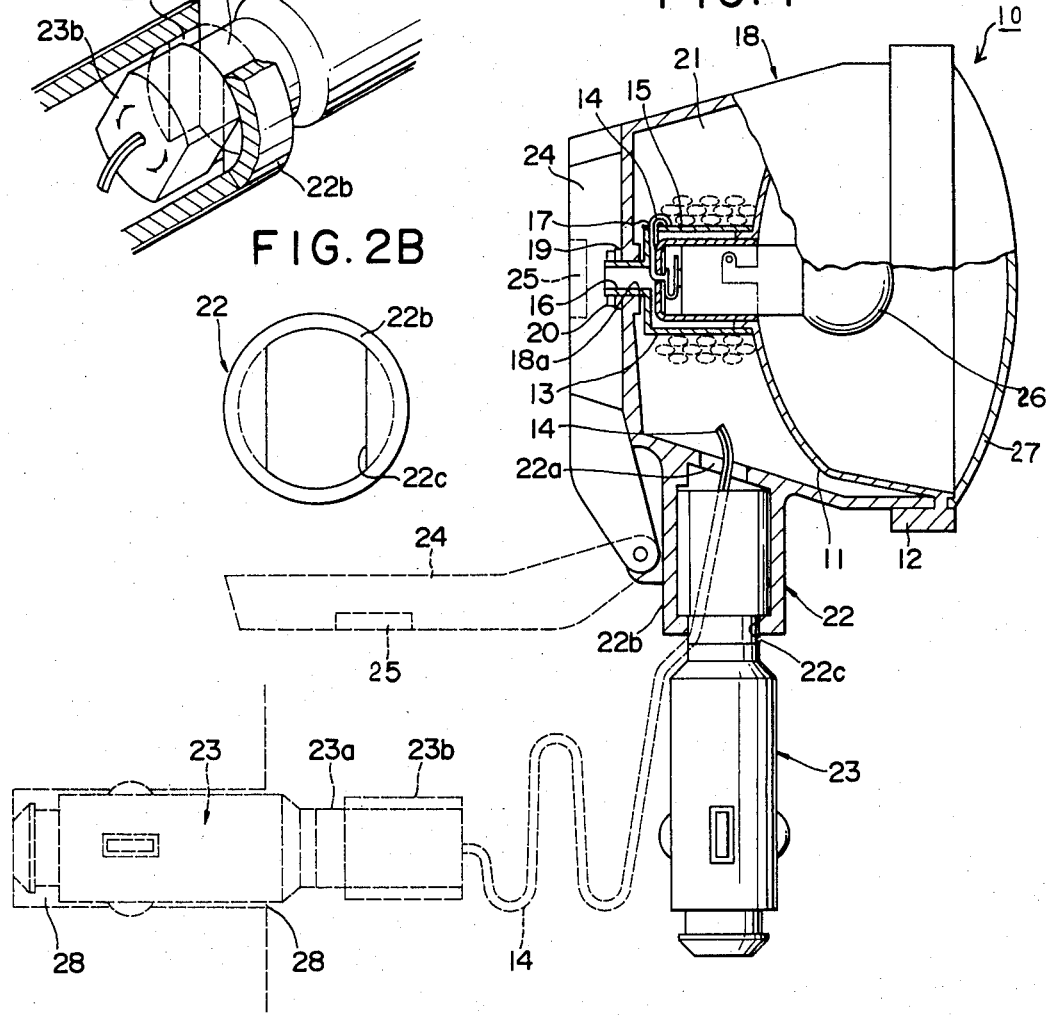
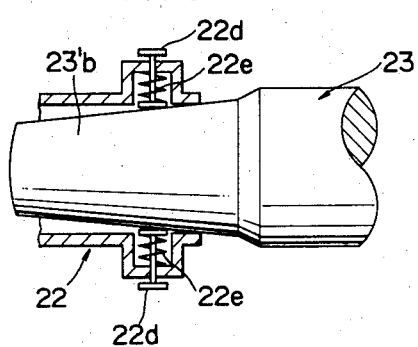
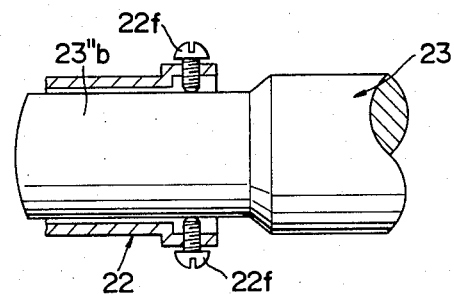

CAR LIGHT WITH DETACHABLE PLUG

BACKGROUND OF THE INVENTION

1. Field of the Invention

The present invention relates to a spotlight and, more particularly, to a car light with a detachable plug, which is reserved in a car so that it may be lit, if necessary, by the use of a cigarette lighter socket of a car.

2. Description of the Prior Art

As is well known in the relevant art, a spotlight of that kind is separated for different uses into a map light, an illuminating light for accident, a warning light and so on. If all of these lights had to be equipped in a car because they are indispensable for their different functions, it would be quite ineconomical in view of their total high price. If, moreover, all of them were equipped, it would be remarkably inconvenient in an emergency because their proper selection is quite troublesome. Anyway, the conventional illuminating devices of those kinds have failed to find a variety of practical applications.

SUMMARY OF THE INVENTION

It is, therefore, an object of the present invention to provide a car light which can be free from the conventional drawbacks as above.

Another object of the present invention is to provide a car light of the above type, which can be lit merely by inserting a detachable plug into a cigarette lighter socket of a car.

A further but important object of the present invention is to provide a car light of the above type, which can find a variety of practical applications, for example, as a map light with the plug being retained and as an illuminating or warning light for use outside of the car upon tire replacement or accident with the plug being apart from the body of the car light.

BRIEF DESCRIPTION OF THE DRAWINGS

Other objects and advantages of the present invention will become apparent from the following description taken in conjunction with the accompanying drawings, in which:

FIG. 1 is a partially sectional view showing the overall construction arrangement of a car light according to the present invention with its plug being in a retained or stored position and in a detached or normally used position and with its support arm being in a contact of stored position and in a detached or sometimes used position;

FIG. 2A is a cut-away perspective view showing a first embodiment of retaining means, by which the plug of FIG. 1 is retained in its hollow receptacle;

FIG. 2B is a front end view of the plug receptacle shown in FIG. 2A;

FIG. 3 is a partially sectional view showing a second embodiment of the retaining means, in which the plug has a taper head and the receptacle is equipped with spring-biased retaining members; and FIG. 4 is similar to FIG. 3 but shows a third embodiment of the retaining means, in which the plug has a straight head and the receptacle is equipped with retaining screws.

DESCRIPTION OF THE PREFERRED EMBODIMENTS

With reference to the accompanying drawing, the present invention will now be described in connection with its embodiments. Generally indicated at reference numeral 10 is a car light with a detachable plug, which exemplifies the present invention. The car light 10 includes a reflecting mirror 11 which has a reflecting surface of hyperboloidal shape and which is formed on the circumference of its open end with an annular groove 12 opened backward. To the center of the rear wall of the reflecting mirror 11, there is integrally mounted a bulb socket 13 which is opened forward and which has its terminals connected with one end of a rewindable cord 14. To the rear wall of the reflecting mirror 11, there is further integrally mounted a cylindrical reel 15 which is made to protrude backward in a manner to cover the bulb socket 13. This reel 15 has its backward end radially reduced to form a reduced portion 16 and its remaining larger diameter portion formed with a cord hole 17.

An outer casing 18 is mounted rotatably on the rear portion of the reflecting mirror 11. More specifically, the outer casing 18 is made of a hard material having electrically insulating properties and bottomed to have a generally bell shape diverging forward. The outer casing 18 thus constructed has its open end circumference fitted loosely in the annular groove 12 of the reflecting mirror 11 and its center bottom hole 18a fitted loosely on the reduced portion 16 of the reel 15. A nut 20 is fastened through a washer 19 on the rear end of the reduced portion 16 so that the outer casing 18 can be turned freely relative to the reflecting mirror 11. Thus, there is established a cord chamber 21 between the outer casing 18 and the reflecting mirror 11. The plug 23 is rewound on the reel 15 by turning the reflecting mirror 11 and outer casing 18 relative to one another.

The outer casing 18 thus far described is formed on its circumferential wall with a hollow plug receptacle 22 which is made to have communciation with the cord chamber 21. This plug receptacle 22 includes a hole portion 22a, which is formed in the circumferential wall thereof, a cylindrical wall 22b, which protrudes outward from the hole portion 22a, and an opening 22c which is located at the outer extremity of the cylindrical wall 22b.

With these construction arrangements, the cord 14 can be led out of the reel 15 by way of the cord hole 17 and the plug receptacle 22 in the order recited. The leading end of the cord 14 is connected with the both terminals of a plug 23.

This plug 23 is so constructed as to be fitted and retained in the cylindrical wall 22b of the receptacle 22 when the cord 14 is accommodated in the cord chamber 21, as will be described later. With close reference to FIGS. 2A and 2B, the plug 23 is formed at its one end with a reduced neck portion 23a and a flattened head portion 23b in accordance with a first embodiment of retaining means. On the other hand, the opening 22c of the receptacle 22 is made to have a narrowed shape corresponding to the cross-section of the flattened head portion 23b so that the latter 23b may pass through the former 22c. Thus, the head portion 23b is inserted through the opening 22c into the inside of the cylindrical wall 22b, and the plug 23 as a whole is turned about 90 degrees. Then, the flattened head portion 23b is brought into abutment engagement with the end of the cylindrical wall 22b, as better seen from FIG. 2B, so that the plug 23 is retained in its receptacle 22 under a locked condition.

Turning now to FIG. 3, there is shown another embodiment of the retaining means of the plug 23. In this second embodiment, the plug 23 is formed with a taper head 23b', and the receptacle 22 is equipped with a pair of retaining members 22d and a pair of corresponding coil springs 22e which are made operative to urge the members 22d radially inwardly. As a result, the plug 23 is retained by the members 22d as it is forced into the receptacle 22 against the biasing forces of the coil springs 22e.

A third embodiment of the plug retaining means is shown in FIG. 4, in which the plug 23 has a straight head 23b". In this embodiment, the receptacle 22 is equipped at its end with a pair of retaining screws 22f which are fastened to retain the plug 23 in position.

Referring to FIG. 1, there is hinged to a suitable portion of the wall of the outer casing 18 a support arm 24 which is made pivotable between a contact position, in which it is in contact with the bottom of the casing 18, as shown in solid lines, and a detached position, in which it is detached therefrom, as shown in broken lines. The support arm 24 thus constructed is equipped at its outer or rear (as viewed when it is in the contact position) side with a permanent magnet 25 so that the car light of the present invention can cling to a desired position of the body of a car, if necessary. As will be easily understood, the support arm 24 can also be used as a hand grip when it is in the detached position.

In order to prepare the car light according to the present invention, a bulb 26 is snapped in the bulb socket 13, and a transparent lens 27 is attached to the open front of the reflecting mirror 11. Then, either the mirror 11 or the outer casing 18 is turned in one direction so that the cord 14 may be taken up or rewound on the reel 15 in the chamber 21. For the installation in the car, moreover, the plug 23 is inserted into the wall 22b of the receptacle 22 so that it may be retained therein.

If the plug 23 in the retained or stored condition plugs in a cigarette lighter socket 28 in the car, the car light 10 of the present invention can be used as a map light.

If, on the other hand, the plug 23 is turned and released from its retained condition in the receptacle 22, then it can be taken out. The plug 23 is then fitted in the cigarette lighter socket 18, and the outer casing 18 is pulled so that the cord 14 may be progressively led out of the chamber 21 through the receptacle 22. Thus, the car light of the present invention can be taken out of the car, while it is lighting, so that it can be used for illumination upon replacement of a tire at night or for warning when an accident takes place. For the former illuminating purpose, the car light can be held on the car body for hands-free operation, while suitably selecting the direction of its spot, by making the support arm 24 cling to the body at its permanent magnet 25. For the latter warning purpose, on the other hand, the transparent lens 27 is replaced by a red one with the result that the usefulness of the light is increased. Alternatively, the lens 27 may have any desired color.

As has been described hereinbefore, the car light of the present invention can be used for the illuminating purposes both inside and outside of the car merely by fitting its plug into the cigarette ligther socket of the car. Thus, the car light according to the invention can accomplish the illuminating operations of different modes, which have conventionally resorted to the respective lights having accordingly different functions. Moreover, in case the car light is used as a map light or not, either of the reflecting mirror or the outer casing may be turned relative to the other so that the cord can be accommodated in the chamber such that it is rewound on the reel. Thus, the car light of the invention can be free from any inconvenience in handling the cord, which might otherside the left long, so that it may be used in a variety of different manners.

I claim:

1. A car light with a detachable plug, comprising:
    a reflecting mirror including a bulb socket having terminals;
    a rewindable cord having one end electrically connected to said terminals of said bulb socket;
    an outer casing including a hollow plug receptacle formed in an outer wall thereof acting as a guide for said cord and including an open portion adapted to operatively receive a rear portion of said reflecting mirror in a manner whereby said outer casing may rotate relative to said reflecting mirror and said reflecting mirror forming a closure for said open portion of said outer casing;
    a reel operatively mounted to said reflecting mirror immediately adjacent said bulb socket in a manner to cover said bulb socket and including a cord hole;
    a cord chamber being formed between said reel mounted on said reflecting mirror and said outer casing to form a substantial area in which said rewindable cord may be encased within said outer casing; and
    means for free-standingly mounting said light comprising a plug electrically connected to the other end of said cord and adapted to be operatively received in a cigarette lighter socket of a car, said plug being shaped and sized to be retained in said hollow plug receptacle when said cord is rewound on said reel by turning either said reflecting mirror or said outer casing relative to the other, said plug having a reduced neck portion and a flattened head portion, and said hollow plug receptacle including a cylindrical wall with a leading end formed with a narrowed opening sized and shaped to fittedly, frictionally receive the flattened head portion of said plug so that said plug can be retained in said hollow plug receptacle when the former is turned after having said flattened head portion inserted into the latter, and in the retained position, said plug and said hollow plug receptacle forming an elongated member projecting outwardly from said outer casing wherein said plug may be operatively received in said cigarette lighter socket of a car even in said retained position.

2. A car light according to claim 1, further comprising a support arm hinged to said outer casing so that it may pivot between a contact position, in which it is in contact with said outer casing, and a detached position in which it is detached therefrom.

3. A car light according to claim 1, further comprising a lens having a desired color and removably mounted on the open end of said reflecting mirror.

4. A car lighter according to claim 2, wherein said reel includes a substantially cylindrical portion having a first diameter which covers said bulb socket and further including a reduced portion which extends from said cylindrical portion, said reduced portion being operatively mounted for rotation within an opening in said outer casing.

5. A car light according to claim 2, wherein said support arm has a permanent magnet so that said car light can cling to a desired portion of the body of the car for hands-free operation while selecting the direction of the spot thereof.

* * * * *